(12) United States Patent
Bassett et al.

(10) Patent No.: US 12,423,152 B2
(45) Date of Patent: Sep. 23, 2025

(54) DEFAULT OPERATING MODES

(71) Applicant: HEWLETT-PACKARD DEVELOPMENT COMPANY, L.P., Spring, TX (US)

(72) Inventors: Jonathan D. Bassett, Fort Collins, CO (US); James Edward Douglas, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 844 days.

(21) Appl. No.: 17/690,925

(22) Filed: Mar. 9, 2022

(65) Prior Publication Data

US 2023/0289233 A1 Sep. 14, 2023

(51) Int. Cl.
*G06F 9/50* (2006.01)
*G06F 11/30* (2006.01)

(52) U.S. Cl.
CPC ........ *G06F 9/5044* (2013.01); *G06F 11/3058* (2013.01)

(58) Field of Classification Search
CPC ............................ G06F 9/5044; G06F 11/3058
See application file for complete search history.

(56) References Cited

U.S. PATENT DOCUMENTS

| | | | | |
|---|---|---|---|---|
| 6,578,106 B1* | 6/2003 | Price | ................ | H04N 21/47214 711/111 |
| 6,591,198 B1* | 7/2003 | Pratt | ...................... | G10K 15/04 702/56 |
| 6,845,404 B2* | 1/2005 | Moczygemba | ....... | G06F 3/0674 710/72 |
| 2003/0158976 A1* | 8/2003 | Moczygemba | ....... | G06F 3/0601 710/72 |
| 2007/0218958 A1* | 9/2007 | Emery | .................. | H04M 1/605 455/67.11 |
| 2008/0181433 A1* | 7/2008 | Thomas | ........... | G10K 11/17873 381/94.5 |
| 2009/0092261 A1* | 4/2009 | Bard | ...................... | G06F 1/3203 381/71.1 |
| 2009/0092262 A1* | 4/2009 | Costa | ..................... | G10K 11/16 381/71.1 |
| 2011/0223006 A1* | 9/2011 | Loh | ......................... | F03D 7/048 415/118 |
| 2016/0188291 A1* | 6/2016 | Vilermo | ................ | G06F 1/1684 345/156 |
| 2020/0310751 A1* | 10/2020 | Anand | .................. | H04R 1/1041 |
| 2022/0404888 A1* | 12/2022 | Prabhakar | ............. | G06F 1/3296 |
| 2023/0289233 A1* | 9/2023 | Bassett | ................. | G06F 9/5044 |

* cited by examiner

*Primary Examiner* — Benjamin C Wu
(74) *Attorney, Agent, or Firm* — Quarles & Brady LLP

(57) ABSTRACT

An example computing device includes a non-transitory machine-readable storage medium encoded with instructions and a processor to execute the instructions. The instructions are executable to detect a hardware configuration of the computing device by identifying hardware components within the computing device and determine an expected acoustic noise emission of the computing device based on the hardware configuration. The instructions are also executable to select a default operating mode of the computing device based on the hardware configuration and set the computing device to the default operating mode.

15 Claims, 5 Drawing Sheets

DEFAULT OPERATING MODES

BACKGROUND

Computing devices include hardware components that individually or collectively execute a wide variety of computing operations. For example, a computing device may include a processor, a memory device, a graphics card, a sound card, transistors and circuitry to connect these and other hardware components. The interoperation of these hardware components provides a user with a wide variety of computing operations that may be executed. While specific reference is made to particular hardware components in a computing device, a computing device may include any variety of hardware components to allow a user to carry out a variety of intended operations.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
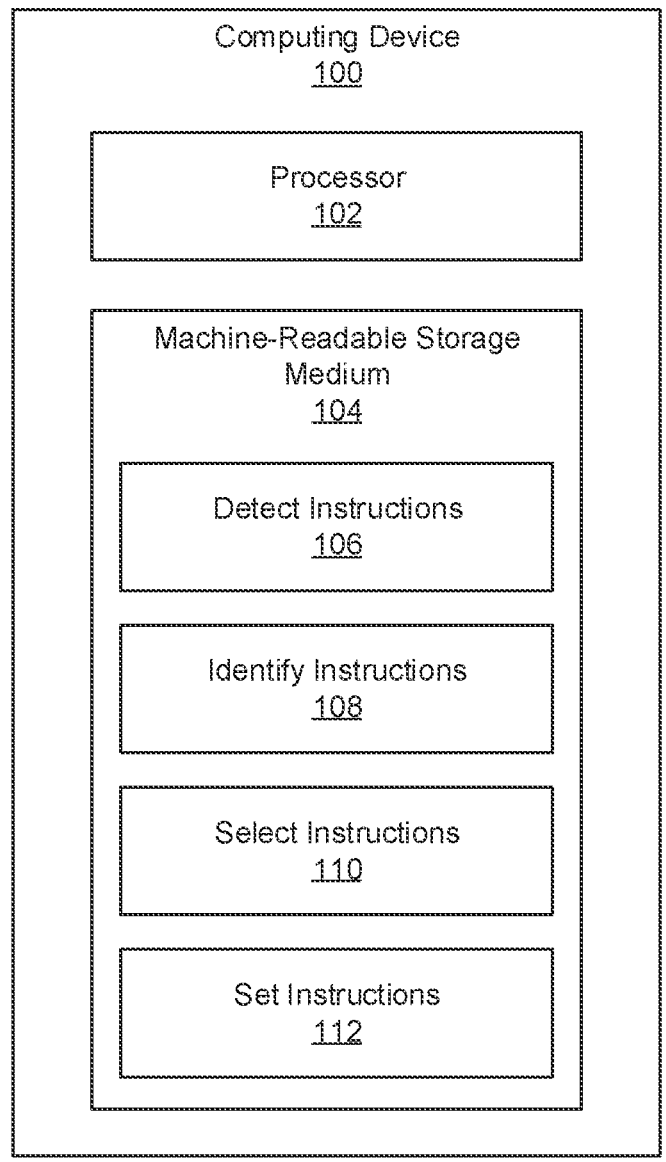
FIG. 1 is a block diagram of a computing device for which a default operating mode is set, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices are used by millions of people daily to carry out business, personal, and social operations and it is not uncommon for an individual to interact with multiple computing devices on a daily basis. Examples of computing devices include desktop computers, laptop computers, all-in-one devices, tablets, and gaming systems to name a few. A computing device may include any number of hardware components. These hardware components operate with other hardware components to execute a function of the computing device. For example, a memory device may include instructions that are executable by a processor. The instructions when executed by the processor, may cause the processor to execute an operation on the computing device. As a specific example, the computing device may include a central processing unit (CPU) and/or a graphics processing unit (GPU). The computing device also includes circuitry to interconnect the hardware components. While specific reference is made to particular hardware components, a computing device may include any number and any variety of hardware components to carry out an intended function of the computing device.

As computing devices are becoming more ubiquitous in society, some developments may further enhance their integration. For example, as the hardware components of a computing device are used, they generate heat. If a hardware component becomes too hot, it may malfunction or otherwise become inoperable. Moreover, if the temperature of the hardware component becomes too great, other components within the computing device may be compromised. Overheating of the components may also pose a safety hazard to users of the computing devices.

Accordingly, computing devices have fans or other cooling systems to maintain the hardware components within a threshold, or safe, operating temperature range. Doing so may ensure that hardware components and the computing device operate as intended. However, the hardware components themselves and the fans or other systems that cool the computing device components generate noise while operating. In some cases, the noise may be distracting to the user and/or environment in which the computing device is used.

Computing devices may be operated in different "modes," each of which trigger particular modes of operation of the cooling system. That is, the temperatures of the hardware components rise as the load on the hardware components increase. As such, the cooling system components are operated at a higher level to ensure adequate cooling. The higher-level operation of the cooling system components may result in even more noise output, which again may be distracting to the user and disruptive in the environment in which the computing device is found.

Furthermore, while a high-performance mode may increase CPU and other component performance, in some cases by 15-20%, many customers do not experience the high-performance mode. This is because the basic input/output system (BIOS) may default to a "normal" performance mode, which caps the operating settings of the hardware components. This cap may be based at least in part of the acoustic output of the hardware components. That is, a computing device in a high-performance mode may be too loud for a general population and a manufacturer may not want to deliver a default product that is too loud. To change the computing device to the high-performance mode, the user enters the BIOS menu to change the setting. However, users may not know of the ability to change to the high-performance mode and may not know how to enter the BIOS to make the change. As such, the full computing capability of a computing device may not be realized. Even if realized, the high-performance mode may have an acoustic noise emission that is greater than desired.

Accordingly, the present specification describes a computing device, method, and non-transitory machine-readable storage medium that detects the hardware configuration for a computing device, determines the expected acoustic noise emission of the computing device with that hardware configuration, and automatically determines a default operating mode for the computing device such that an acoustic threshold is maintained. That is, the present computing device chooses the default operating mode based on an understanding of the acoustic noise emission expected for a specific hardware configuration. If the expected acoustic output of the computing device is below a threshold even when in the high-performance mode, the computing device default operating mode is set as the high-performance mode. If the expected acoustic noise emission of the computing device when in the high-performance mode is greater than the acoustic threshold, the default operating mode is set to be a lower performance mode, where the cooling system may be able to operate at a lower, and quieter, level. In either case, a user may override the default operating mode and select a different operating mode that is based on a user-desired balance between acoustic noise emission and performance. Note that while particular reference is made to two operating modes, i.e., a high-performance mode and a lower performance mode, the present computing device, method, and non-transitory machine-readable storage medium may be implemented in a system that selects between more than two operating modes to establish as a default operating mode for the computing device.

Specifically, the present specification describes a computing device. The computing device includes a non-transitory machine-readable storage medium encoded with instructions and a processor to execute the instructions. The instructions are executable by the processor to 1) detect a hardware configuration of the computing device by identifying hardware components within the computing device and 2) identify an expected acoustic noise emission of the computing device based on the hardware configuration. The instructions are also executable by the processor to select a default operating mode of the computing device based on the expected acoustic noise emission of the computing device and set the computing device to the default operating mode.

The present specification also describes a method. According to the method, a hardware configuration for a computing device is determined by identifying hardware components within the computing device. An acoustic threshold is determined and a default operating mode is selected for the computing device such that an expected acoustic noise emission of the computing device is below the acoustic threshold. The computing device is then set to the default operating mode by altering operation of the hardware components within the computing device.

The present specification also describes a non-transitory machine-readable storage medium encoded with instructions executable by a processor. The machine-readable storage medium includes instructions to, when executed by the processor, cause the processor to determine a hardware configuration of a computing device by identifying hardware components found in the computing device and identifying, for each hardware component, an expected acoustic noise emission in each operating mode. The instructions are executable by the processor to cause the processor to determine the total expected acoustic noise emission of the computing device in each operating mode (e.g., high-performance mode and a lower performance mode) by combining the expected acoustic outputs of each of the hardware components. The instructions are also executable to determine an acoustic threshold, set a default operating mode of the computing device to be the highest-performance mode that has an expected acoustic noise emission less than the acoustic threshold, and alter operation of the hardware components based on the default operating mode and the acoustic threshold.

In summary, using such a computing device, method, and machine-readable storage medium may, for example, 1) ensure certain acoustic thresholds are met; 2) provides for a higher performance default operating mode for a computing device; and 3) allows for user alteration of the default operating mode. However, it is contemplated that the compute devices disclosed herein may address other matters and deficiencies in a number of technical areas, for example.

Turning now to the figures, FIG. 1 is a block diagram of a computing device (100) for which a default operating mode is set, according to an example of the principles described herein. As described above, the computing device (100) may be of a variety of types including a desktop computer, a laptop computer, a gaming system, an enterprise workstation, or any variety of computing device (100). The computing device (100) includes a variety of hardware components that generate heat during operation. Examples of such components include a CPU, a GPU, memory devices, other processors, and other integrated circuits. Accordingly, the computing device also includes hardware components which are to cool these and other hardware components of the computing device (100). For example, the computing device (100) may include a fan, a heat sink, or a liquid-based cooling system. The combination of the hardware components that are found in the computing device (100) define the "hardware configuration" of the computing device (100). Throughout the present specification, while reference is made to particular hardware components, a variety of other hardware components may be found within the computing device (100).

The operation of the cooling system components may generate acoustic noise. To prevent the overall acoustic noise emission of the computing device (100) from being too high, the computing device (100) may be set to a default operating mode that balances acoustic noise emission and performance. As a particular example, the computing device (100) may be set to a "standard" operating mode wherein the overall acoustic noise emission of the computing device (100) does not exceed a predetermined acoustic threshold, such as 34 decibels (dB).

However, it may be that the particular hardware configuration may facilitate a different mode, which may provide higher performance and yet may still emit acoustic noise at a level lower than a predetermined acoustic threshold. Accordingly, the present computing device (100) determines the hardware configuration for the computing device (100), that is the hardware components that are found within the computing device (100), and determines the expected acoustic noise emission of the computing device (100) based on the hardware components found therein. Based on a comparison of 1) the expected acoustic noise emission of the computing device (100) in different operating modes and 2) an acoustic threshold, the computing device (100) sets the computing device (100) in a particular default operating mode.

Accordingly, the computing device (100) includes a processor (102) and a non-transitory machine-readable storage medium (104) encoded with instructions. The processor (102) is to execute the instructions to perform a number of operations related to the selection of a default operating mode and setting the computing device (100) to operate based on the default operating mode.

Specifically, the processor (102) is to execute detect instructions (106) to detect a hardware configuration of the computing device (100). The processor (102) may do so by identifying what hardware components are found within the computing device (100) and the properties of those hardware components. That is, a computing device (100) may include a certain set of hardware components. Different types, makes, models, or revisions, of different hardware components may operate differently. For example, a first CPU may have a higher power draw capability, or may have a higher processing bandwidth, as compared to a second CPU.

These different components may have different thermal responses to an operating load and as such may trigger different operational parameters for the cooling system. As a particular example, a CPU that has a higher processing capability may generate more heat based on the higher processing bandwidth. Accordingly, the higher power CPU may trigger a higher fan speed in order to properly cool the higher power CPU. As yet another example, different fans may have different cooling capacities such that a first fan may provide a greater cooling effect at a lower fan speed as compared to another fan.

All this demonstrates that different hardware configurations may result in different acoustic noise emissions. Accordingly, by determining the hardware configuration of the computing device (100), the processor (102) may determine the expected acoustic noise emission of the cooling system and the computing device (100) in general. While particular reference is made to the detection of a CPU as well as the operational characteristic (i.e., identify, type, make, model, revision, or other operational characteristic) of the CPU, other hardware components may be detected which include, but are not limited to a GPU, heat sink, or a fan.

In some examples, determination of which hardware components, as well as the make, model, revision, or other operating parameters for the hardware components, may be based on a lookup table or a register. That is, the computing device (100) may include a database or other register that identifies the hardware components found within that particular computing device (100).

In another example, determination of the hardware configuration of a particular computing device (100) may be based on queries wherein the processor (102) queries the different hardware components for a component identifier as well as for the operational characteristics of the hardware components. While particular reference is made to different instructions to determine the hardware configuration of the computing device (100), the processor (102) may determine the hardware configuration of the computing device (100) in different ways.

The processor (102) also executes identify instructions (108) to identify an expected acoustic noise emission for the computing device (100) based on the hardware configuration. This may occur in a variety of ways. In one example, the expected acoustic noise emission of each hardware component may be combined to determine the overall expected acoustic noise emission of the computing device (100). That is, the overall expected acoustic noise emission for the computing device (100) is based on the combination of the expected acoustic noise emissions of each of the hardware components.

In some examples, the determination of the expected acoustic noise emission of each hardware component may be based on a database table. For example, the computing device (100) may include a database, or may reference a remote database, which includes a mapping between expected acoustic noise emission and hardware components. For example, the database may be indexed by hardware component and may include an associated expected acoustic noise emission for each hardware component. The expected acoustic noise emission associated with a particular hardware component may be based on historical empirical information, such as previously measured or collected values. As a particular example, during development of a hardware component, a product developer may measure the acoustic noise emission of a hardware component.

In some examples, the expected acoustic noise emission may be based on an operating mode of the hardware component. That is, as described above, different operating modes of a hardware component may trigger operation of the cooling system components at different levels, which different levels generate different acoustic noise emissions. As a particular example, a CPU in a lower performance mode may be cooler so as to allow a cooling fan to be run at a lower fan speed, which is quieter. By comparison, the CPU in a higher performance mode may be hotter so as to trigger an increased fan speed to ensure the CPU does not generate excessive heat from the higher load experienced in the higher performance mode. As such, the database that maps hardware components to expected acoustic noise emissions, may specify the expected acoustic noise emission of the cooling system in different operating modes.

Accordingly, the processor (102) may identify what the acoustic noise emission for the computing device (100) is expected to be when the computing device (100) components (i.e., the CPU, GPU, and other components) are operating in a high-performance mode.

By comparison, the processor (102) may identify what the acoustic noise emission for the computing device (100) is expected to be when the computing device (100) components (i.e., the CPU, GPU, and other components are operating in a lower performance mode.

While particular reference is made to identifying expected acoustic noise emission via a look up table that associates hardware components in their various operating modes with a measured acoustic noise emission, in some examples the processor (102) may determine expected acoustic noise emission in different ways. While particular reference is made to different instructions to determine the expected acoustic noise emission of the computing device (100) while in different operating modes, the processor (102) may determine the expected acoustic noise emission of the computing device (100) in different ways.

In either case, the processor (102) executes select instructions (110) to select a default operating mode of the computing device (100) based on the expected acoustic noise emission of the computing device (100). That is, the processor (102) may determine into which of the various operating modes the computing device (100) is to be placed based on the expected acoustic noise emission of the computing device (100). Determining the default operating mode may be based on a comparison of the expected acoustic noise emission with an acoustic threshold, which acoustic threshold is a predetermined level. That is, the processor (102) may determine, based on some predetermined threshold, what operating mode for the computing device (100) should be the default operating mode.

The operating mode that the computing device (100) is set to may be the operating mode that results in the highest performance, while maintaining the acoustic noise emission below an acoustic threshold. For example, a first computing device (100) may be able to operate in a high-performance mode and output audio noise at a level below the acoustic threshold based on the hardware components in the first computing device. However, a second computing device with different hardware components may not be able to operate in the high-performance mode and keep the computing device (100) acoustic noise emission under the acoustic threshold. Accordingly, the processor (102) executing the select instructions (110) may evaluate the expected acoustic noise emission of the computing device (100) against the threshold to determine whether the computing device (100) is expected to be able to operate in the high-performance mode all while staying underneath the acoustic threshold.

In some examples, the selection of the default operating mode may be based on a lookup table or database register to identify which operating mode should be the default operating mode. The lookup table or database register may include a mapping between hardware configuration and the default operating mode that the computing device (100) should be set to. Accordingly, having identified a particular hardware configuration, the processor (102) may reference the lookup table to determine that for this particular hardware configuration, the default operating mode should be a higher performance operating mode as the computing device (100) can operate in that higher performance mode while outputting audio noise at a level below the threshold.

In another example, the mapping may be between the expected acoustic noise emission and the default operating mode that the computing device (100) should be set to. Accordingly, having identified a particular expected acoustic noise emission, the processor (102) may reference the lookup table to determine that for this particular expected acoustic noise emission, the default operating mode should be the higher performance mode.

As such, the present computing device (100) selects the default operating mode for the computing device (100), not arbitrarily, but based on the specific hardware configuration, and based on the particular expected acoustic noise emission of the specific hardware configuration.

In addition to selecting the default operating mode, the processor (102) may also execute set instructions (112) to set the computing device (100) to the default operating mode. That is, the processor (102) may enforce certain operating parameters for each of the hardware components. For example, the processor (102) may limit the fan speed of the cooling fan so as to not rise above the acoustic threshold. Similarly, the processor (102) may limit the rate, or number, of operations that are performed by the CPU so that the CPU does not warm up to a degree where a cooling fan would have to run at a speed that would generate noise greater than the threshold. While particular reference is made to particular operations that may be restricted, the processor (102) may enforce any number of parameters so as to ensure that the operation of the hardware components, and supplemental components that cool the hardware components, are not noisier than the acoustic threshold.

Note that while the present computing device (100) is described in relation to the acoustic noise emission and operation of a CPU and fan, the principles described herein may be applied to other system components, such as a GPU, which may drive computing device (100) acoustic noise.

Figure 2:
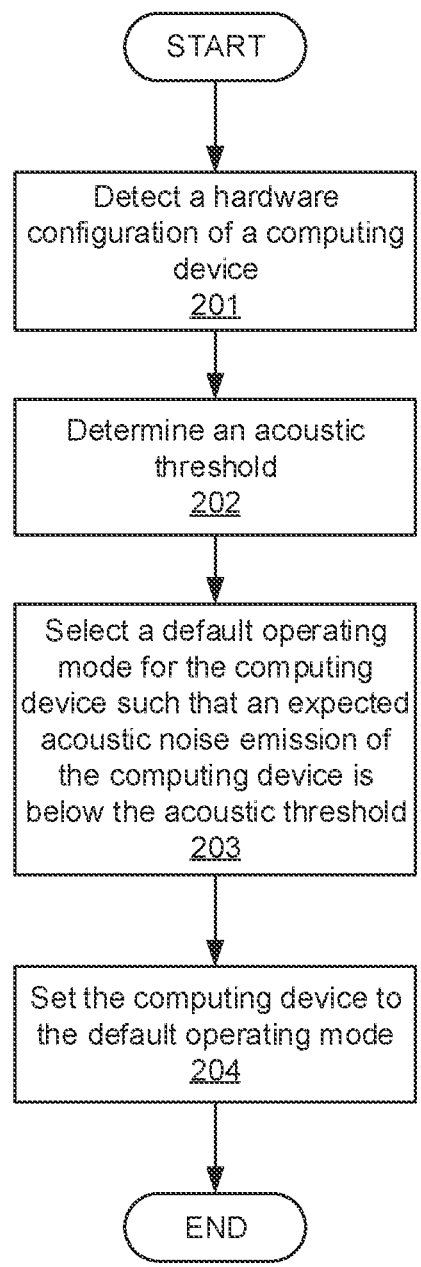
FIG. 2 is a flowchart of a method for setting a default operating mode for a computing device, according to an example of the principles described herein.

FIG. 2 is a flowchart of a method (200) for setting a default operating mode for a computing device (100), according to an example of the principles described herein. That is, the method (200) proscribes how a computing device (100), and more particularly a processor (102) of the computing device (100), may determine what operating mode the computing device (100) should default to, or initially be placed in. That is, as described above, a computing device (100) may have different operating modes, with the computing device (100) providing different levels of computing capability in each mode. While a higher performance mode may provide greater computing capability, the higher performance mode may also result in increased noise output due to the operation of the cooling components which operate at an increased capacity to cool the hardware components.

In either case, the processor (102) may detect (block 201) a hardware configuration for the computing device (100), which detection (block 201) includes identifying hardware components in a computing device (100). In some examples, this detection (block 201) be based on a database that identifies the hardware components included in a particular computing device (100). That is, the computing device (100) may include a memory device which lists all the hardware components found within.

As described above, each hardware component may be associated with multiple expected acoustic noise emissions. That is, the components within the computing device that cool hardware components within the computing devices (100) contribute to the overall acoustic noise emission of the computing device (100). Accordingly, in an example, the processor (102) may reference a database which identifies (block 201) the expected acoustic noise emission based on the hardware components found therein. As a particular example, the database may be populated with measured acoustic noise emission values of various computing devices with different hardware configurations. That is, the database may map hardware configurations to an expected acoustic noise emission.

The method (200) may also include determining (block 202) an acoustic threshold. The acoustic threshold may be a value against which the expected acoustic noise emission is compared to determine if a default operating mode for the computing device (100) is a higher-performance mode or a lower-performance mode.

In an example, the acoustic threshold may be an upper boundary threshold. That is, if expected acoustic noise emission in a particular mode is greater than the acoustic threshold, the computing device (100) is placed in a lower noise and likely lower performance, mode. For example, the acoustic threshold may indicate that if a computing device (100) may operate in a high-performance mode while the expected acoustic noise emission is less than 35 dB, the computing device (100) may default to the high-performance mode. By comparison, if the computing device (100) has an expected acoustic noise emission of 40 dB when in the high-performance mode, the computing device (100) default mode may be a lower performance mode.

In another example, the acoustic threshold is an average acoustic output over a period of time. For example, the threshold may be that the average expected acoustic noise emission over a 2-minute time period does not exceed 30 dB. In such an example, spikes in acoustic noise emission may be permitted due to, for example, shortened periods of increased processing. While particular reference is made to particular acoustic thresholds, different acoustic thresholds, or different values of acoustic thresholds, may be implemented in accordance with the principles described herein.

With the acoustic threshold and the hardware configuration for the computing device identified, the processor (102) may select (block 203) a default operating mode for the computing device (100) such that the expected acoustic noise emission of the computing device (100) is less than the acoustic threshold. Specifically, the computing device (100) may have a default mode that provides the highest performance while maintaining an expected acoustic noise emission less than the threshold.

As described above, in some examples, the selection (block 203) may be based on a database register or a lookup table. For example, the computing device (100) may include a lookup table that maps the hardware configuration to a default operating mode. That is, the table may indicate a computing device (100) with a particular hardware configuration may be operated in a high-performance mode and still provide an acoustic noise emission that is lower than the threshold. Accordingly, the processor (1020 may set (block 204) the computing device (100) to the selected default operating mode. As described above, setting (block 204) the computing device (100) to a selected default operating mode may include altering operational limits of the hardware components within the computing device (100). This may include capping, removing a cap, or otherwise altering hardware component performance so that hardware performance does not trigger a cooling component to operate above a level that raises the acoustic noise emission above the acoustic threshold. For example, the processor (102) may restrict the fan speed of a cooling fan or may restrict the processing load, i.e., the number of operations performed, by a CPU so that noise is below the acoustic threshold or may raise a fan speed threshold and/or a CPU processing load if such can be accomplished without exceeding the acoustic threshold.

Figure 3:
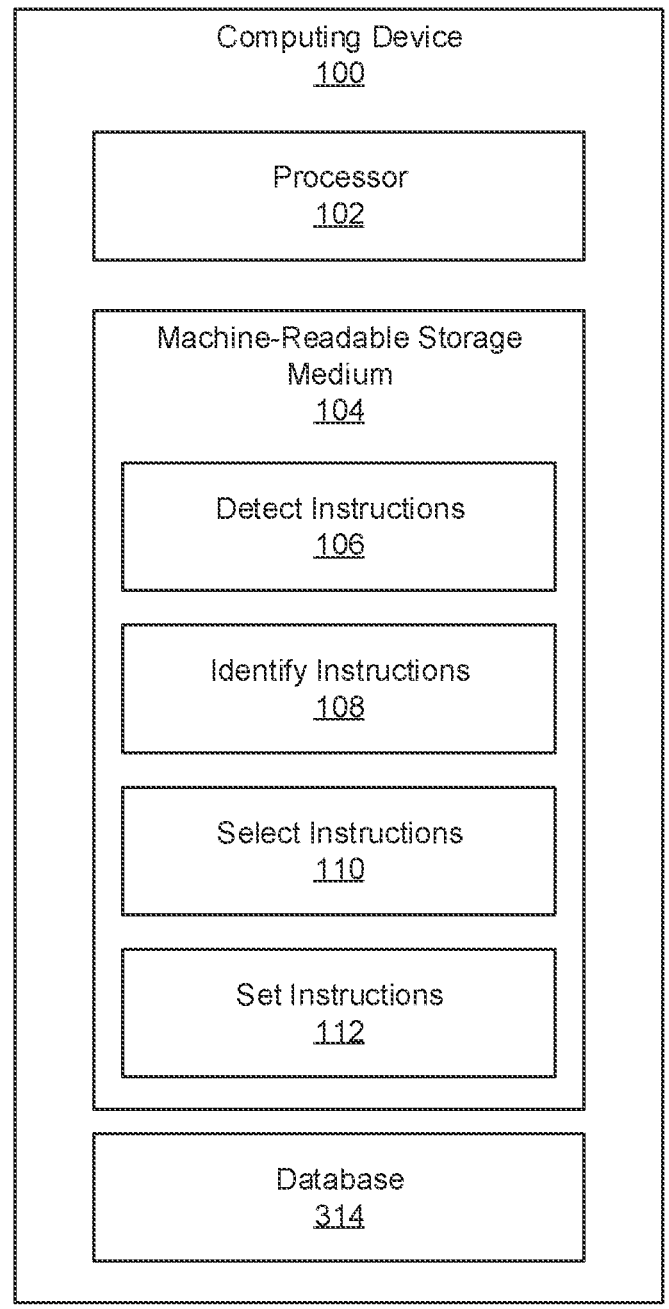
FIG. 3 is a block diagram of a computing device for which a default operating mode is set, according to an example of the principles described herein.

FIG. 3 is a block diagram of a computing device (100) for which a default operating mode is set, according to an example of the principles described herein. As described above, the computing device (100) may include a processor (102) and machine-readable storage medium (104) with various instructions executable by the processor (102) to ensure operation at sub-acoustic threshold levels.

In this example, the computing device (100) may include additional components. For example, the computing device (100) may include a database (314) which maps expected acoustic noise emission to hardware configurations and operating modes. That is, as described above, the mapping may indicate what the expected acoustic noise emissions are for various combinations of hardware components and in some examples the various combinations operating in different modes. That is, the database (314) may include entries which identify what the associated expected acoustic noise emission is for a particular combination of hardware components. In some examples, the database (314) entries may be based on historical information from similar hardware configurations. That is, as described above, during development or use of similar devices, acoustic noise emission data may be collected for individual hardware components, or different combinations of hardware components. From this information, the processor (102) may identify 1) an expected acoustic noise emission and/or 2) a default operating mode for the computing device (100) based on the expected acoustic noise emission.

Figure 4:
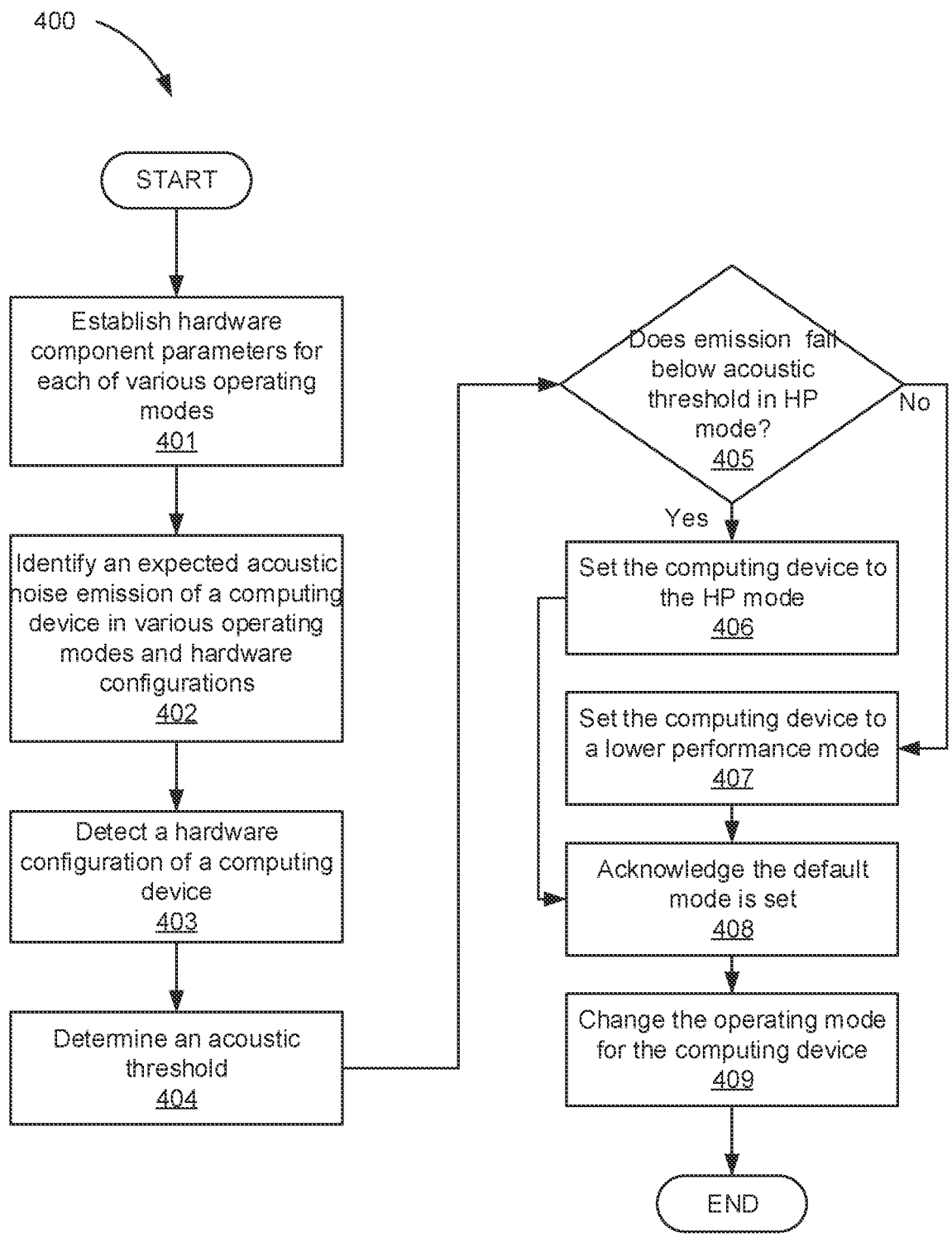
FIG. 4 is a flowchart of a method for setting a default operating mode for a computing device, according to an example of the principles described herein.

FIG. 4 is a flowchart of a method (400) for setting a default operating mode for a computing device (100), according to an example of the principles described herein. In this example, the method (400) includes establishing (block 401) hardware component parameters for each of the various operating modes. That is, as described above, to ensure that acoustic noise emission is below an acoustic threshold level, hardware components may be governed such that they do not perform higher than a predetermined level, thus reducing the thermal responses of the hardware components themselves as well as the components that cool these hardware components. Accordingly, the operating parameters for the various hardware components may be established (block 401) so as to achieve a desired level of performance.

As a specific example, the parameters that are set may be the CPU power/frequency and the fan speed/noise, in some cases as a function of time and temperature. More specifically, the processor may seek to maximize performance (maximum power, frequency and duration thereof) while ensuring the CPU does not exceed temperature limits that could jeopardize its function or reliability. The CPU runs at a given power/frequency until the CPU temperature rises toward some pre-determined threshold, at which point the CPU power/frequency is stepped down to avoid overheating. In high performance mode however, a higher power/frequency may be allowed, and/or the temperature limit at which the power/frequency is reduced may be higher. Allowing higher CPU power/frequency results in higher CPU temperatures, fan speeds, and noise. However, if the computing device has a more capable thermal solution, these drawbacks may be mitigated enough so that the high-performance mode may be the default operating mode.

As another example, the processor may seek to maximize fan performance while managing temperatures and acoustic noise emissions. The fans may be run at a base speed. As the CPU temperature or other temperatures increase, the fan speed is increased. In high performance mode, the base fan speed may be set higher and the fan may be more aggressively ramped to a higher fan speed when the temperature starts to increase. Another example of a fan parameter that is set for the high-performance mode is the maximum fan speed. That is, in a lower power mode, the fan speed may be capped at some lower maximum. However, this may not enable the CPU to run at a high power/frequency or may enable high power/frequency operation, but for a short period of time. Accordingly, in the high-performance mode with the higher maximum speed, the CPU may be run at the high power/frequency more for a longer period of time.

As described above, a computing device (100) may have various operating modes, each with different performance parameters for the hardware components. The method (400) may include identifying (block 402) expected acoustic noise emission of computing devices (100) with different hardware configurations and identifying the expected acoustic noise emission for each of different operating modes. The processor (102) may also detect (block 403) a hardware configuration found in the computing device (100) and determine (block 404) an acoustic threshold. These operations may be performed as described above in connection with FIG. 2.

The processor (102) may then determine (block 405) if the expected acoustic noise emission of the computing device (100) is below the acoustic threshold while in a high-performance (HP) mode. If so, (block 405, determination yes), the processor (102) sets (block 406) the computing device to the high-performance mode. If the computing device (100) is not able to operate in the HP mode and maintain an expected acoustic noise emission below the acoustic threshold (block 405, determination NO), the processor (102) sets (block 407) the computing device (100) to a lower performance mode, which lower performance mode provides a quieter user experience at the expense of performance. In summary, the processor (102) identifies which combinations of hardware configurations and operating modes result in expected acoustic noise emission that achieves a target acoustic noise emission level and selects a default operating mode based on the hardware configuration so as to achieve the target acoustic noise emission level. The processor (102) may then acknowledge (block 408) or verify that the default mode is set.

As described above, the methods (200, 400) establish a default operating mode for the computing device (100). However, the operating mode may be changed (block 409). In one example, this may be initiated by a user. For example, a user may enter the BIOS and change the default operating mode either permanently, or temporarily.

In other examples, changing (block 409) the operating mode for the computing device (100) may be based on different criteria. For example, the processor (102) may change (block 409) the operating mode for the computing device (100) responsive to the acoustic noise emission rising above the acoustic threshold. That is, the default operating mode may be selected based on an expected acoustic noise emission. However, for any variety of reasons and due to any variety of circumstances, the actual acoustic nose output may exceed the expected value. Accordingly, in this example based on a detected acoustic noise emission surpassing the acoustic threshold, the processor (102) may change (block 409) the operating mode. As a particular example, a fan speed which may be expected to result in acoustic noise less than the acoustic threshold may in fact result in acoustic noise that exceeds the acoustic threshold.

In another example, an expected fan speed may be expected to appropriately cool a hardware component. However, it may be the case that a higher fan speed is actually used to cool the hardware component as desired. In either case, the processor (102) may detect the increased fan speed and/or increased noise of the existing fan speed, and may change (block 409) the operating mode accordingly. Such a determination may be made based on output of an acoustic sensor or based on a table that maps fan speeds to acoustic noise emission.

In another example, the operating mode may be changed (block 409) based on a change in the hardware configuration of the computing device (100). As described above different hardware components contribute differently to the acoustic noise emission of a computing device (100). Accordingly, when the hardware configuration of a computing device (100) changes, so does the acoustic profile. As such, the processor (102) may, responsive to a detected change in the hardware configuration of the computing device (100), re-evaluate the acoustic noise emission of the computing device (100) with the updated hardware configuration and re-determine which operating mode should be the default operating mode as described above in connection with FIG. 2. Such a re-evaluation and re-determination may result in a new default operating mode that is different than the initial default operating mode.

Each of these examples represents an increase in the acoustic noise emission. Accordingly, in each of these examples, responsive to the acoustic noise emission of the computing device (100) in the high-performance mode being greater than the acoustic threshold, the processor (102) may set the default operating mode of the computing device (100) to be a lower performance mode. Accordingly, the operating mode for the computing device (100) may be managed dynamically, based on actual computing device (100) behavior.

Figure 5:
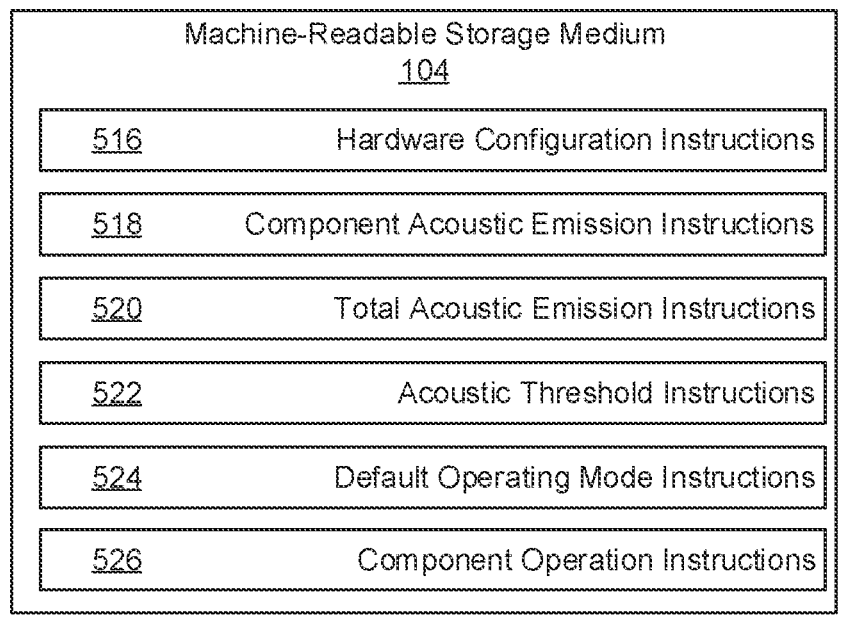
FIG. 5 depicts a non-transitory machine-readable storage medium for setting a default operating mode for a computing device, according to an example of the principles described herein.

FIG. 5 depicts a non-transitory machine-readable storage medium (104) for setting a default operating mode for a computing device (100), according to an example of the principles described herein. As used in the present specification, the term "non-transitory" does not encompass transitory propagating signals.

To achieve its desired functionality, a computing device (100) includes various hardware components. Specifically, a computing device (100) includes a processor (102) and a machine-readable storage medium (104). The machine-readable storage medium (104) is communicatively coupled to the processor. The machine-readable storage medium (104) includes a number of instructions (516, 518, 520, 522, 524, 526) for performing a designated function. The machine-readable storage medium (104) causes the processor (102) to execute the designated function of the instructions (516, 518, 520, 522, 524, 526). The machine-readable storage medium (104) can store data, programs, instructions, or any other machine-readable data that can be utilized to operate the computing device (100). Machine-readable storage medium (104) can store computer readable instructions that the processor (102) of the computing device (100) can process, or execute. The machine-readable storage medium (104) can be an electronic, magnetic, optical, or other physical storage device that contains or stores executable instructions. Machine-readable storage medium (104) may be, for example, Random Access Memory (RAM), an Electrically Erasable Programmable Read-Only Memory (EEPROM), a storage device, an optical disc, etc. The machine-readable storage medium (104) may be a non-transitory machine-readable storage medium (104).

Hardware configuration instructions (516), when executed by the processor (102), cause the processor (102) to, determine a hardware configuration of a computing device (100) by identifying hardware components found in the computing device (100). Component acoustic output instructions (518), when executed by the processor (102), cause the processor (102) to identify, for each hardware component, an expected acoustic noise emission in each performance mode. Total acoustic output instructions (520), when executed by the processor (102), cause the processor (102) to, calculate the total expected acoustic noise emission of the computing device (100) in each performance mode by combining the expected acoustic noise emissions of each of the hardware components. Acoustic threshold instructions (522), when executed by the processor (102), cause the processor (102) to determine an acoustic threshold. Default operating mode instructions (524), when executed by the processor (102), cause the processor (102) to set a default operating mode of the computing device (100) to be the highest performance mode that has an expected acoustic noise emission less than the acoustic threshold. Component operation instructions (526), when executed by the processor (102), cause the processor (102) to alter operation of the hardware components based on the default operating mode and acoustic threshold.

In summary, using such a computing device, method, and machine-readable storage medium may, for example, 1) ensure certain acoustic thresholds are met; 2) provides for a higher performance default operating mode for a computing device; and 3) allows for user alteration of the default operating mode. However, it is contemplated that the compute devices disclosed herein may address other matters and deficiencies in a number of technical areas, for example.

What is claimed is:

1. A computing device comprising:
 a non-transitory machine-readable storage medium encoded with instructions; and
 a processor in communication with the non-transitory machine-readable storage medium, wherein the processor is to execute the instructions to:
  detect a hardware configuration of the computing device, wherein the computing device comprises a plurality of hardware components, wherein to detect the hardware configuration, the processor executes the instructions to identify (i) a hardware component of the computing device based on the presence of the hardware component in the computing device, and (ii) an operational parameter for the hardware component, and wherein the operational parameter comprises at least one type, model, or revision;
  identify an expected acoustic noise emission of the computing device based on an acoustic noise emission expected from the hardware configuration;
  select a default operating mode of the computing device based on the expected acoustic noise emission of the computing device; and
  set the computing device to the default operating mode.

2. The computing device of claim 1, wherein the processor is to execute further instructions to:
  identify a combination of the hardware configuration and an operating mode that results in the expected acoustic noise emission of the computing device achieving a target acoustic noise emission level; and
  select the default operating mode based on (i) the expected acoustic noise emission of the computing device that achieves the target acoustic noise emission level, and (ii) the operating mode identified in the combination.

3. The computing device of claim 1, wherein the processor is to execute further instructions to map acoustic noise data to hardware configurations and operating modes in a database.

4. The computing device of claim 3, wherein the database is includes historical information for hardware configurations similar to the hardware configurations mapped to the operating modes.

5. The computing device of claim 1, wherein:
  the processor is to execute further instructions to compare the expected acoustic noise emission of the computing device to an acoustic threshold, and
  the acoustic threshold comprises an upper boundary threshold.

6. The computing device of claim 1, wherein:
  the processor is to execute further instructions to compare the expected acoustic noise emission of the computing device to an acoustic threshold; and
  the acoustic threshold comprises an average acoustic output over a period of time.

7. The computing device of claim 1, wherein the processor is to execute further instructions to change an operating mode for the computing device responsive to an acoustic noise emission of the computing device rising above an acoustic threshold.

8. The computing device of claim 1, wherein the processor is to execute further instructions to change an operating mode for the computing device responsive to a change in the hardware configuration of the computing device.

9. The computing device of claim 1, wherein the plurality of hardware components comprises:
  a central processing unit (CPU);
  a graphics processing unit (GPU);
  a heat sink;
  a fan; or
  a combination thereof.

10. A method comprising:
  detecting a hardware configuration of a computing device, wherein the computing device comprises a plurality of hardware components, wherein detecting the hardware configuration comprises identifying (i) a hardware component of the computing device based on the presence of the hardware component in the computing device, and (ii) an operational parameter for the hardware component, and wherein the operational parameter comprises at least one type, model, or revision;
  determining an acoustic threshold;
  selecting a default operating mode for the computing device such that a first expected acoustic noise emission of the computing device is below the acoustic threshold, wherein the first expected acoustic noise emission of the computing device is identified based on a first acoustic noise emission expected from the hardware configuration; and
  setting the computing device to the default operating mode, wherein setting the computing device to the default operating mode comprises altering operation of a hardware component of the plurality of hardware components within the computing device.

11. The method of claim 10, further comprising, responsive to a change in the hardware configuration of the computing device, identifying a second expected acoustic noise emission of the computing device based on a second acoustic noise emission expected from the hardware configuration that is changed.

12. The method of claim 11, further comprising selecting a different default operating mode based on the second expected acoustic noise emission of the computing device.

13. The method of claim 10, further comprising establishing a first hardware component parameter for a first operating mode and a second hardware component parameter for a second operating mode.

14. A non-transitory machine-readable storage medium including instructions that, when executed by the processor, cause the processor to:
  determine a hardware configuration of a computing device, wherein the computing device comprises a plurality of hardware components, wherein to determine the hardware configuration, the processor executes the instructions to identify (i) a hardware component of the computing device based on the presence of the hardware component in the computing device, and (ii) an operational parameter for the hardware component, and wherein the operational parameter comprises at least one type, model, or revision;
  for each hardware component in the hardware configuration,
    identify an expected acoustic noise emission for the hardware component in each performance mode of the computing device, wherein the expected acoustic noise emission is based on an acoustic noise emission expected from the hardware component;
  calculate a total expected acoustic noise emission of the computing device in each performance mode by combining the expected acoustic noise emissions of each of the hardware components in the hardware configuration;
  determine an acoustic threshold;
  set a default operating mode of the computing device to be a highest-performance mode that has a total expected acoustic noise emission less than the acoustic threshold; and
  alter operation of a hardware component of the plurality of hardware components based on the default operating mode and the acoustic threshold.

15. The non-transitory machine-readable storage medium of claim 14, further including instructions that, when executed by the processor, cause the processor to:
  responsive to an acoustic noise emission of the computing device in the default operating mode being greater than the acoustic threshold, set the default operating mode of the computing device to be a lower performance mode.

* * * * *